United States Patent [19] [11] 4,225,684
Falk [45] Sep. 30, 1980

[54] HIGH IMPACT PVC COMPOSITIONS WITH CROSS-LINKED POLYESTER MODIFIERS

[75] Inventor: John C. Falk, Chicago, Ill.

[73] Assignee: Borg-Warner Corporation, Chicago, Ill.

[21] Appl. No.: 43,574

[22] Filed: May 29, 1979

[51] Int. Cl.² ............................................. C08L 67/06
[52] U.S. Cl. ................................ 525/169; 260/29.2 E
[58] Field of Search ..................... 525/169; 260/29.2 E

[56] References Cited

U.S. PATENT DOCUMENTS

| | | | |
|---|---|---|---|
| 2,448,585 | 9/1948 | Fuller | 525/169 |
| 3,376,246 | 4/1968 | Valentine et al. | 525/169 |

Primary Examiner—J. Ziegler
Attorney, Agent, or Firm—Richard J. Schlott

[57] ABSTRACT

Compositions comprising vinyl chloride polymers and from 10 to 25 wt % of a cross-linked, aliphatic polyester elastomer, said polyester elastomer being produced by preparing a cross-linked latex of the polyester.

2 Claims, No Drawings

HIGH IMPACT PVC COMPOSITIONS WITH CROSS-LINKED POLYESTER MODIFIERS

BACKGROUND OF THE INVENTION

This invention relates to impact-modified polyvinyl chloride (PVC) compositions. More particularly, this invention relates to high impact compositions comprising PVC and a cross-linked elastomeric polyester.

Vinyl chloride polymers, without further modification, are brittle, inflexible low-impact materials. Methods for improving the impact properties of PVC have included forming blends of PVC with a second polymeric resin such as ABS or MBS resin, or a chlorinated olefin rubber. Examples of such modifiers are disclosed in U.S. Pat. Nos. 3,264,373, 3,886,232 and 3,467,732.

Linear aliphatic polyester elastomers have long been known in the art. These polymers are generally compatable with PVC and linear, uncross-linked polyesters have been found to be useful as plasticizers for PVC, as is disclosed in U.S. Pat. No. 3,501,554. These polyester plasticizers markedly improve the flexibility and processability of PVC, but do not effect a significant improvement in impact properties.

SUMMARY OF THE INVENTION

Linear aliphatic high molecular weight polyester elastomers, when suitably cross-linked, are effective impact modifiers for PVC. The polyester elastomers are prepared by conventional processes, converted to a latex and cross-linked in latex form to provide a finely divided particulate polyester elastomer which may be blended with a PVC latex, or coagulated to provide a free-flowing powdered solid which is readily compounded with PVC. The cross-linked, finely-divided, particulate polyester elastomer is a highly effective impact modifier for PVC polymers.

DETAILED DESCRIPTION OF THE INVENTION

The impact modifiers of the present invention are useful with polymers of vinyl chloride and copolymers thereof wherein one or more other ethylenically unsaturated monomers is copolymerized with vinyl chloride. Comonomers useful in the preparation of the polyvinyl chloride copolymers include: vinyl bromide; vinyl acetate; vinylidene chloride; lower allyl esters; vinyl alkyl ethers, acrylonitrile and methacrylonitrile; acrylic acid and methacrylic acid; acrylic and methacrylic esters such as methyl acrylate, ethyl acrylate and methyl methacrylate; styrene; and the like. The copolymers will preferably contain greater than 75 wt% vinyl chloride.

The cross-linked polyester elastomers suitable for the purposes of this invention are linear, high molecular weight aliphatic polyester rubbers which have been converted to a latex, then cross-linked. The latex may be employed in blending directly, or coagulated to form free-flowing rubber particles.

The polyesters suitable for the purposes of this invention are the linear aliphatic polyesters described and set forth in U.S. Pat. No. 2,448,585. In general, the elastomeric polyesters may be described as copolymers of aliphatic dicarboxylic acids and glycols wherein from about 0 to about 20% of the glycol and/or the dicarboxylic acid is ethylenically unsaturated. More particularly, the polyesters will be polymers of $C_2$ to $C_{10}$ alkylene glycols and $C_4$ to $C_{10}$ alkylene dicarboxylic acids wherein from 0 to about 20% of the glycol monomer component and/or the dicarboxylic acid monomer component is, respectively, a $C_4$ to $C_{10}$ dihydroxy alkene or a $C_4$ to $C_{10}$ alkenyl dicarboxylic acid. Examples of suitable alkylene glycols include ethylene glycol, propylene glycol, tetramethylene glycol, pentamethylene glycol, hexamethylene glycol, decamethylene glycol, the position isomers thereof such as isopropylene glycol neopentyl glycol, dimethyl tetramethylene glycol and the like, as well as mixtures thereof. Suitable dihydroxyalkenes include, for example, dihydroxybutene, dihydroxyhexene and the like. The alkylene dicarboxylic acids include, for example, succinic acid, adipic acid, sebacic acid and the like, as well as mixtures thereof. The alkenyl dicarboxylic acids which may be employed for the preparation of unsaturated polyesters include maleic acid, fumeric acid, itaconic acid, citraconic acid and the like. The polyesters may be readily produced by the processes set forth in the cited prior art, and the particular method of their preparation does not form a part of the instant invention.

In preparing the cross-linked polyester latex useful in the practice of this invention, the polyester is first dissolved in a suitable organic solvent. To be useful for the purposes of this invention, the organic solvent must be immiscible with water, and be sufficiently volatile to be readily stripped from an aqueous emulsion. Examples of suitable solvents include chloroform, methylene chloride, benzene, toluene and the like.

The solution will contain from about 5 to about 20 wt%, preferably from about 7.5 to about 12.5%, of the polyester. Concentrated solutions of polyesters are generally extremely viscous masses which flow and are dispersed only with great difficulty. The particular concentration to be employed will be chosen to provide a moderately viscous, readily pumpable liquid. Low concentrations, and in particular concentrations below about 5 wt%, are to be avoided in part to reduce the amount of solvent to be stripped from the emulsion in a subsequent step. In practice it has been found that for most combinations of solvents and polyesters a concentration in the preferred range of 7.5 to 12.5 wt% provides a readily dispersable, easily handled liquid.

An emulsion of the polyester is then prepared by mixing the solution of polyester with approximately an equal volume of water containing a surfactant. Any of the variety of commercially available surfactants such as the sodium alkyl aryl sulfonates may be employed to stabilize the emulsion. An amount of from about 0.5 to about 10 wt% based on the weight of polyester to be emulsified is generally sufficient to provide a stable latex. The mixing is carried out under high shear conditions, preferably by passing the mixture through a homogenizer to completely disperse the organic phase and form an essentially uniform, oil-in-water emulsion.

The solvent will then be stripped from the emulsion by heating the mixture and distilling the solvent. The distillation may be accomplished under vacuum, if desired, to hasten solvent removal, and steam-stripping or sparging may also be used if preferred. The resulting solvent-free latex comprises finely dispersed, uncross-linked polyester in aqueous emulsion.

Cross-linking of the polyester in latex form is accomplished by adding a suitable peroxide catalyst such as benzoyl peroxide, lauryl peroxide or the like, and heating the mixture to effect decomposition of the peroxide and cross-linking of the polyester. The amount of peroxide will be from about 0.5 to about 5 wt%, based upon the weight of polyester. Although the peroxide may be dispersed into emulsion prior to stripping or into the solvent-free, uncross-linked latex, it is generally more practical to add the peroxide to the solution of the polyester prior to forming the initial emulsion. The solvent-stripping and cross-linking can then be accomplished by heating the emulsion to effect solvent removal, then continuing the heating of the solvent-free latex to complete the cross-linking reaction. The product, a cross-linked polyester latex, may be employed in forming blends with solutions or laticies of PVC polymers, or may be coagulated or precipitated to provide a cross-linked polyester rubber as a finely-divided, free-flowing powder for subsequent blending with PVC.

Preparation of Cross-linked Polyester Impact Modifiers

EXAMPLE 1

Preparation of the Polyester

A resin flask was charged with 70.1 g (0.48 m) of adipic acid, 4.8 g (0.078 m) of ethylene glycol, 29.5 g (0.39 m) of propylene glycol, 6.4 g (0.072 m) of 1,4dihydroxybutene-2, and 0.24 g of zinc acetate catalyst. The mixture was heated at 140°–150° C. under nitrogen for approximately five hours. The temperature was then raised to 200°–220° C. over a two hour period, and held at that temperature under a vacuum of 0.5 mm for an additional two hours. The mixture was then cooled to room temperature. The reaction mass was a crummy solid liquid having a $\eta sp/c$ of 0.61 (25° C.) and a number average molecular weight of 18,5000.

EXAMPLE 2

Preparation of a Polyester Latex

A solution of 20 g of the polyester of Example 1 in 200 ml of methylene chloride was prepared and added to 200 ml of water containing 0.2 g of an alkyl aryl sulfonate surfactant. The mixture was passed twice through a Manton Gaulin homogenizer to produce a stable emulsion. The emulsion was heated with stirring to 90° C. to distill out the methylene chloride, resulting in a stable latex of uncross-linked polyester elastomer.

The latex was coagulated with isopropanol, collected by filtration and dried to give a tacky solid gum. The gum was completely soluble in toluene, indicating that no gel formation had occurred.

EXAMPLE 3

Preparation of a Cross-linked Polyester Latex

A solution of 20 g of the polyester of Example 1 and 0.4 g of benzoyl peroxide in 200 ml of methylene chloride was prepared and emulsified with 200 ml of water containing 0.2 g of an alkyl aryl sulfonate surfactant as in Example 2. The emulsified mixture was heated with stirring to 90° C. to distill out the methylene chloride, then held at 90° C. for about 17 hours to effect cross-linking of the polyester. The product was a stable latex of cross-linked polyester.

The latex was coagulated with isopropanol, collected by filtration and dried to give a free-flowing powder. The powdered cross-linked elastomer had a gel content of 91% as determined by toluene extraction.

EXAMPLE 4

Preparation of a Cross-linked Saturated Polyester Latex

A saturated polyester was prepared from 0.48 m (97 g) of sebacic acid and 0.44 m (33.4 g) of propylene glycol, using 0.24 g of zinc acetate catalyst and employing the process of Example 1. A solution of 20 g of the polyester and 1.0 g of benzoyl peroxide in 200 ml of methylene chloride was emulsified, solvent stripped and cross-linked by heating at 90° C. for 16 hours, by following the methods of Example 3. The product was a stable latex of cross-linked, saturated polyester.

The cross-linked, saturated polyester was coagulated with isopropanol, collected by filtration and dried to give a free-flowing powder. The powdered cross-linked elastomer had a gel content of 71%, determined by extraction with toluene.

As is apparent from the Examples, stable cross-linked saturated (Example 3) and unsaturated (Example 4) polyester laticies are readily produced by the process of this invention. The coagulation of the cross-linked laticies result in free-flowing powdered elastomers, completely different in physical characteristics from the tacky gum elastomers (Example 1). That the powdery nature of the products is not the result of precipitation from a latex is demonstrated by Example 2, in which an uncross-linked latex produces a gummy solid upon coagulation.

Preparation of the Blends

The following examples illustrate the preparation of blends typical of this invention. All blends were prepared by adding polyesters to the following masterbatch formulations:

Example 5

PVC Masterbatch A

| Material | Tradename and Source | Parts by Weight |
|---|---|---|
| PVC | Geon 93 BF Goodrich Chemical Co. | 100 |
| Processing Aid | Acryloid K-120 N. Rohm and Haas Co. | 2.0 |
| Tin Stabilizer | Thermolite 31 | 2.0 |
| Lubricant | Aristowax 165 | 1.2 |
| Calcium Stearate | — | 0.8 |
| TiO$_2$ | OR-450 American Cyanamid | 8.0 |

EXAMPLE 6

PVC Masterbatch B

| Material | Tradename and Source | Parts by Weight |
|---|---|---|
| PVC | Geon 93 BF Goodrich Chemical Co. | 100 |
| Processing Aid | Acryloid K-120 N Rohm and Haas Co. | 2.0 |
| Tin Stabilizer | Mark 1414 A Argus Chemical Corp. | 2.0 |
| Lubricant | Hoechst Wax E Farkewerke Hoechst, A.G. | 0.4 |
| Lubricant | Aldo MS Glyco Chemicals, Inc. | 0.9 |
| Toner | | 0.075 |

The lubricants and stabilizers employed for the PVC masterbatch formulations and the particular formulation shown are typical of a wide variety of PVC formulations known to the prior art and available through commercial sources and trade publications, and do not of themselves form a part of the instant invention.

Mill blends were prepared by mixing the requisite amounts of the polyester and the PVC masterbatch on a two-roll mill at a temperature in the range 360°–400° F. for 4 to 10 minutes then compression molded at 400° F. to provide plaques and test specimens.

The solvent blends were prepared by adding the polyester latex to a 10% solution of the PVC masterbatch in chloroform. The mixture was stirred, coagulated with methanol, and dried in a vacuum oven overnight. The blends were then milled at 360°–400° F. for 4 to 10 minutes and compression molded at 400° F. to provide plaques and test specimens.

TABLE I

| Ex. No. | PVC Ex. No. | Polyester Ex. No. | %[1] | Blend Method[2] | Izod Impact ft lbs/in notch, 73° F. |
|---|---|---|---|---|---|
| 7 | 5 | 3 | 0 | sol'n | 0.4 |
| 8 | 5 | 3 | 2 | sol'n | 0.5 |
| 9 | 5 | 3 | 5 | sol'n | 0.6 |
| 10 | 5 | 3 | 10 | sol'n | 1.2 |
| 11 | 5 | 3 | 15 | sol'n | 9.8 |
| 12 | 5 | 3 | 20 | sol'n | 15.4 |
| 13 | 6 | 3 | 0 | sol'n | 0.4 |
| 14 | 6 | 3 | 2 | sol'n | 0.6 |
| 15 | 6 | 3 | 5 | sol'n | 1.1 |
| 16 | 6 | 3 | 10 | sol'n | 2.5 |
| 17 | 6 | 3 | 15 | sol'n | 20.2 |
| 18 | 6 | 3 | 20 | sol'n | 20.5 |
| 19 | 6 | 3 | 15 | mill | 15.2 |
| 20 | 6 | 1[3] | 15 | mill | <1 |
| 21 | 6 | 1[3] | 15 | sol'n | <1 |

Notes:
[1] % by wt. polyester in final blend.
[2] sol'n = blend of latex with 10% solution of PVC formulation; see text. Mill = blend of dry powder with PVC, milled; see text.
[3] Control Examples with uncrossed-linked polyester of Example 1.

It will be apparent from these data that the cross-linked polyester elastomers are effective impact modifiers for PVC. At levels below about 10 wt% (Examples 10 and 16), the impact improvement is marginal. At polyester levels of 15 and 20 wt%, the impact improvement is outstanding. The cross-linking of the polyester is required, as shown by a comparison of Examples 10 and 16 with control Examples 20 and 21 containing linear, uncross-linked polyesters. These uncross-linked polyesters are typical of the polyesters employed as plasticizers in the prior art, and do not improve the impact properties of PVC compositions.

The remaining physical properties of these blends are also attractive. The blend of Example 17, containing 15 wt% of the cross-linked polyester, had a heat deflection temperature of 65° C. (264 psi), a tensile strength of 5550 psi and tensile elongation of 20%.

Thus, the instant invention will be seen to be an impact-modified PVC composition comprising from 90 to 75 wt% of a polymer of vinyl chloride and, correspondingly, from 10 to 25 wt% of a cross-linked, aliphatic polyester elastomer. As will be apparent to those skilled in the art, the compositions may further include stabilizers, process aids, dyes, pigments, fillers and the like as is commonly practical in the PVC formulating art. It will be further apparent to those skilled in the art that various modifications and variations in the preparation of the instant impact modifiers and blends may be made without departing from the spirit and scope of the instant invention, the scope of which is defined by the appended claim.

I claim:

1. An improved PVC composition comprising from 90 to 75 wt% of a polymer of vinyl chloride and from 10 to 25 wt% of a cross-linked aliphatic polyester elastomer.

2. The composition of claim 1 wherein said polyester elastomer is produced by the process consisting of
    A. Preparing a solution comprising from 95 to 80 parts by weight of a water-immiscible organic solvent, from 5 to 20 parts by weight of an aliphatic polyester elastomer and from 0.5 to 5 wt%, based on polyester, of an organic peroxide;
    B. Mixing said solution with an equal volume of water containing from 1 to 10 wt%, based on polyester, of a surfactant;
    C. Passing said mixture through a homogenizer to form an emulsion;
    D. Heating said emulsion to remove said solvent; and
    E. Further heating said emulsion to cross-link said polyester.

* * * * *